April 3, 1956 — W. G. COLESTOCK — 2,740,469
FLOW CONTROL APPARATUS
Filed April 14, 1950
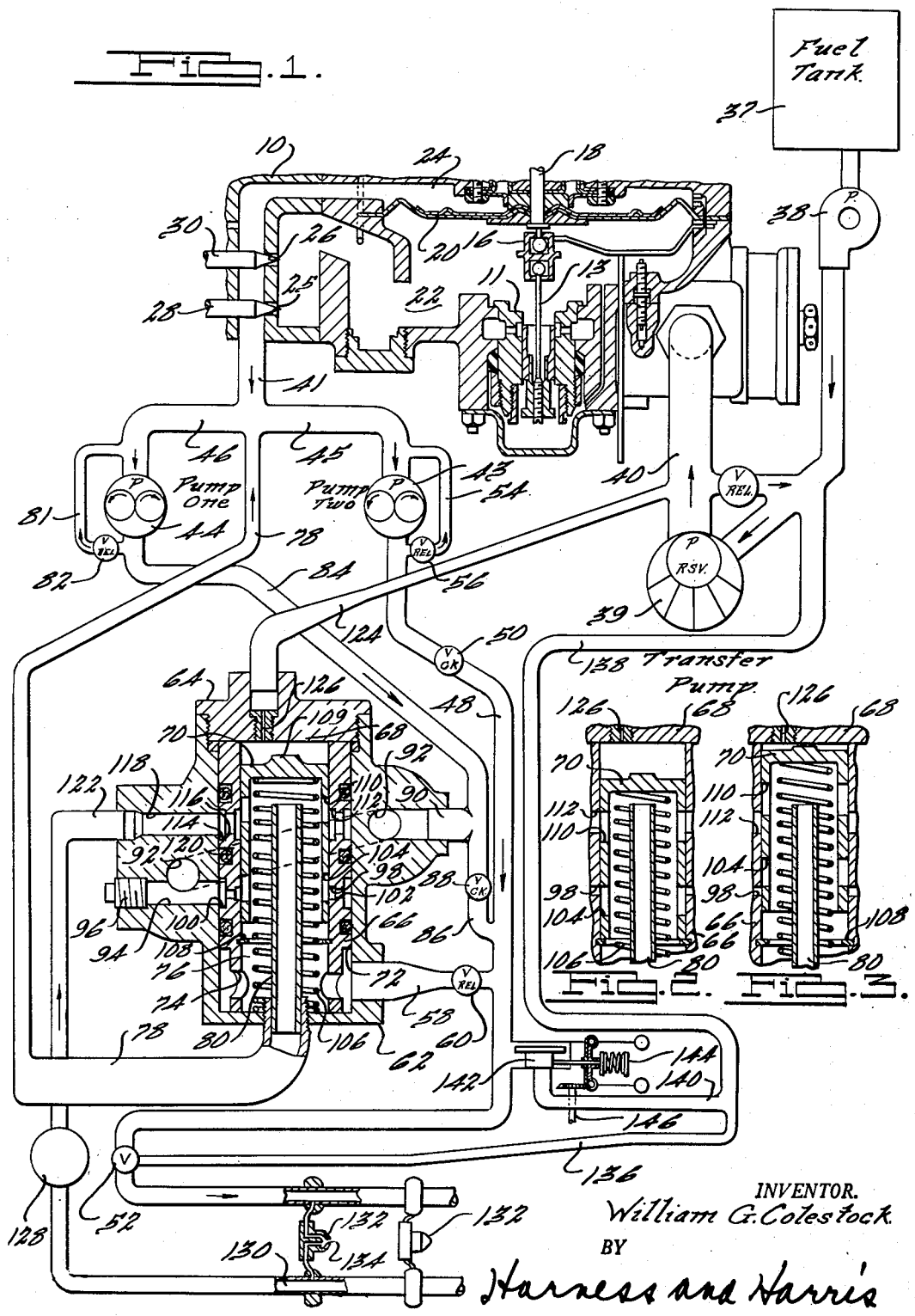
INVENTOR.
William G. Colestock
BY
Harness and Harris
ATTORNEYS.

United States Patent Office 2,740,469
Patented Apr. 3, 1956

2,740,469

FLOW CONTROL APPARATUS

William G. Colestock, Detroit, Mich., assignor to Chrysler Corporation, Highland Park, Mich., a corporation of Delaware Application April 14, 1950, Serial No. 155,992

8 Claims. (Cl. 158—36.4)

The present invention relates to a regulating device for a plurality of pumps in a pressure fluid system, and more particularly to a fluid system serving a return flow spray nozzle.

According to a feature of the invention, a device is provided which regulates the quantity of fluid returned to a pump intake from a bypass nozzle in response to variation in the pump intake pressure. The same device also serves to relate the effective outputs of the several pumps, which are connected in common to the intake, in accordance with the pump intake pressure and thereby provides at all times a fluid supply to the return flow nozzle even when one of the pumps becomes disabled. These results are accomplished through valve control of the nozzle return conduits in addition to valve control of a direct bypass across any pump other than the principally operating pump.

According to a further feature, the pump control is provided in conjunction with a metering device, the changes in pressure drop across which due to metering being effectively sensed to make necessary control adjustments.

According to yet a further feature, provision is made to relieve undue pressures in the pump discharges by means of a common relief path through the foregoing control device.

Other features, objects, and advantages will either be specifically pointed out or become apparent when for a better understanding of the invention, reference is made to the following written description taken in conjunction with the accompanying drawings wherein:

Figure 1 is a sectional and part schematic view showing the invention applied to a metered fluid system for return flow nozzles; and Figures 2 and 3 are fragmentary sections of valving of Figure 1 to show certain operating positions.

In Figure 1, reference character 10 designates a fuel metering device which will be described only briefly herein since it forms no per se part of the present invention. For a more specific description of the device, attention is directed to the copending application of Vogt and Nims Serial No. 763,576 filed July 25, 1947, now Patent Number 2,609,662. The metering device 10 includes a regulating valve 11 controlled by a valve stem 13. Valve stem 13 is linked at 16 to a controlling member 18 positioned by air and fuel diaphragms. The fuel diaphragm, shown at 70, is responsive to unmetered fuel pressure in chamber 22 and metered fuel pressure in chamber 24, as determined by the pressure drop across metering orifices 25 and 26.

The size of the metering orifice 25 is controlled by a needle valve 28, which may be regulated by electrical means responsive, for instance, to signals from a temperature-sensitive device, not shown. The orifice 26 is controlled by a needle valve 30, which may be manually operable. Fuel is supplied from a tank 37 to a booster pump 38, thence to a transfer pump 39 and thence through a conduit 40 to the metering device. Fuel leaves the metering device by way of a conduit 41.

The above described details of metering device 10 are important to the multiple pump system about to be described to the extent that said system is controlled by the difference between the pressure of fuel as received by the metering device through the conduit 40 and the pressure of fuel as delivered by the metering device in the conduit 41. These pressures are different because of pressure losses in the regulating valve 11 and the metering orifices 25 and 26.

The multiple pump system comprises essentially a principal pump 43 which is adapted normally to deliver the fuel at the same time greatly increasing its pressure from metering device 10 to a combustion device and one or more secondary pumps 44 which are normally adapted merely to bypass and to deliver fuel to the combustion device only in the event of failure or unsatisfactory operation of pump 43. The combination device is preferably one suited to use in turbine and pumps 43 and 44 may be driven continually from a common shaft deriving its power from a component of the turbine power plant. Line 41 splits into lines 45 and 46 leading respectively to pumps 43 and 44. A discharge line 48 containing a check valve 50 leads from the pump 43 to a valve 52. A relief line 54 for pump 43 connects the intake and discharge sides of the pump and carries a relief valve 56. A portion 58 of line 48 carries a relief valve 60 and forms a connection with the casing 62 of a regulating device 64.

Adjacent its connection with portion 58 of line 48, casing 62 contains the annular recess portion 72 formed on a sleeve or valve body part 66 received within casing 62. Through one or more openings 74 the chamber defined by annular recess 72 communicates with the interior chamber 76 of regulating device 64. At one end, regulating device 64 comprises a cover 68 and at the other end a common bypass or return conduit 78 which may have an upstanding pipe extension 80 serving in a capacity to insure against valve 64 becoming air bound. Line 78 connects at its discharge end with the intakes 45 and 46 of the pumps. Pump 44 is provided with a bypass 81 which carries a relief valve 82.

A line 84 connects pump 44 with the line 48 through a portion 86 carrying a check valve 88. Another portion 90 of line 84 is connected to casing 62 in registry with a cross-over passage 92 leading into a chamber 94 formed in casing 62. Chamber 94 has a plug 96 at one end and communicates inwardly with an inner annular recess 98 in sleeve 66 through an outer annular recess 100 therein and one or more openings 102.

A valving coaction is afforded by means of a shiftable balanced piston valve 70, which is formed with one or more openings 104 leading into the interior chamber 76. The valve 70 is adapted to be biased by a member 106 in chamber 76 which may be a coil spring and acts between limits comprising a stop 108 adjacent one end and the cover 68 at the other end, which is engageable by an upstanding boss 109 formed on valve 70.

Spaced in the direction of reciprocation of valve 70 from openings 104 are one or more openings 110 which cooperate in relative registry with an inner annular recess 112 formed in sleeve 66. Recess 112 communicates through one or more openings 116 with an outer annular recess 114 establishing connection with a casing chamber 118. Chamber 118 is connected with a line 122 containing a fluid cooler 128. A line 124 has an end provided with a restriction 126 connected to cover 68 of the valving device 64 and the other end connected to conduit 40 leading into metering device 10.

At a point upstream of cooler 128, line 122 has a connecting portion 130 with the bypass of one or more nozzles 132 each having an ejection orifice 134. A conduit comprising lines 136 and 138 leads from valve 52 back to transfer pump 39. Another conduit 140 connects lines 48 and 138 and is controlled by a dumping valve 142 positioned in response to a speed sensitive device 144 which serves as an overspeed governor and is rotated by a drive shaft 146 driven from a component of the turbine power plant above mentioned.

It will be observed that piston valve 70 in the position shown in Figure 1 partially blocks the opening presented by annular recess 112. Accordingly, a restriction is imposed on the downstream end of the return flow conduit 122 from the fluid nozzles and a portion of the discharge of pump 43 is caused to be ejected from nozzle 132 and another portion is returned through opening 110, downpipe 80, and then through line 78 to the pump intake. If the pressure in the delivery line 41 of fuel metering device 10 falls and the pressure in the receiving line 40 remains relatively constant as is usually the case, then the change in pressure difference acting on the piston valve 70 causes it to move downward from the position shown thereby providing less restriction to the opening of recess 112 connected with the bypass line 78 for pump 43, and more fuel is bypassed to line 45. This position of valve 70 is shown in Figure 2. Owing to the change in the pressure differential, valve 70 will continue to move downward until the resistance of coil spring 106 counterbalances the motivating force and thereby stops movement of piston valve 70 with respect to sleeve 66.

It will, of course, be recognized upon relative movement of piston valve 70 downward in valve body sleeve 66 due to a drop in pressure in lines 41, 78, that the return flow through the circuit 130, 122, 112, 110, 80, 78 will forthwith increase to a higher rate and thereby supplement the pump suction flow available at pump intakes 45, 46 such that for a given pump speed, pumps 43, 44 have available and can deliver under the circumstances, much the same gross output of flow as was delivered by the pumps before piston valve 70 was caused to move. Additionally, the increase in return flow in this situation of a given pump speed not only tends to make available and to permit the pumps 43, 44 to handle about the same gross quantities of flow as before, but also tends to facilitate pumps 43, 44 maintaining an output pressure having a relatively small percentage variation in magnitude in pump discharge line 48.

If the pressure in the delivery line 41 of the fuel metering device becomes too high, the net effective fuel pressure acting downwardly on piston valve 70 is reduced to the point where the force of spring 106 is the prevailing force and the piston valve 70 moves upward to increase the restriction of the opening of annular recess 112 in valve sleeve 66. In this event, less of the discharge of pump 43 is delivered to line 122 at the nozzles and the pressure in conduit 41 is reduced to restore the necessary pressure difference between the lines 40 and 41 to halt movement of the piston valve 70. During this period the entire discharge of the other pump 44 is bypassed to line 78 for the opening of annular recess 98 in the sleeve valve part is unrestricted and discharge of pump 44 cannot flow in the discharge portion 84 beyond check valve 88 against equal or greater pressure existing in the discharge line for pump 43.

If the pump 43 is disabled or operates unsatisfactorily, the pressure in the delivery line 41 of fuel metering device 10 will rise considerably causing the piston valve 70 to be raised to the point where the section adjacent recess 98 will at least partially block the opening of annular recess 98 in the valve sleeve. Thus the amount of bypass by the pump 44 through openings 104 and conduit 78 is reduced and fuel is delivered by the pump 44 through the discharge line 84 past check valve 88 and thence through portion 86 into the discharge line 48 for pump 43 through which it passes to the valve 52 and nozzles 132. The diminished bypass flow from pump 44 causes a reduction of pressure in line 41 sufficient to stop upward movement of the piston valve 70. Should further upward movement be required to insure proper operation, piston valve 70 may move upward completely to block the opening of the valve sleeve annular recess 98.

The completely blocked position of annular recess 98 is shown in Figure 3. Further movement of the valve upward from that shown in Figure 3 will result in recess 98 remaining blocked and in the recess 112 being progressively covered by valve part 70. If pump 43 again functions properly, pressure in the line 41 will be sufficiently lowered to cause the piston valve 70 to be lowered until the entire output of pump 44 is bypassed to line 78 by virtue of the complete uncovering of the sleeve valve annular recess 98 while a portion of the output of pump 43 is bypassed to line 78 due to the partial or complete uncovering of the opening of sleeve valve annular recess 112.

Variations within the spirit and scope of said invention are equally comprehended by the foregoing description.

What is claimed is:

1. In combination, a system comprising means for pumping fluid under pressure and having discharge and intake sides, a return flow nozzle adapted to be supplied by the aforesaid means and having supply and return conduits connected respectively to discharge and intake sides of the means aforesaid, means forming a bypass path between discharge and intake sides of the means aforesaid, and having a portion in common with said return conduit, and an intake-pressure-responsive unitary valve means adjustable with respect to said common portion for alternately blocking or partially blocking the bypass path while partially blocking the return conduit for the nozzle and for partially blocking the return conduit while leaving free the bypass path between the discharge and intake sides aforesaid.

2. In combination, means for pumping fluid under pressure and having discharge and intake sides, a plurality of pressure-fluid utilizing devices having supply and return conduits connected respectively to discharge and intake sides of the means aforesaid, means forming a bypass path between discharge and intake sides of the means aforesaid, and having a portion in common with said return conduit, and single valve means adjustable with respect to said common portion for alternately blocking or partially blocking the bypass path while partially blocking the return conduit for the plurality of pressure fluid utilizing devices and for partially blocking the return conduit while leaving free the bypass path between the discharge and intake sides aforesaid.

3. In combination, a system of fluid apparatus and connected piping comprising a first pump for pumping fluid under pressure and having discharge and intake sides, a nozzle of the return flow type having supply and return conduits connected respectively to discharge and intake sides of the first pump, means forming a bypass path between discharge and intake sides of the first pump, and having a portion in common with said return conduit, and a valve adjustable with respect to said common portion for alternately blocking or partially blocking the bypass path while partially blocking the return conduit for the nozzle and for partially blocking the return conduit while leaving free the bypass path between the discharge and intake sides aforesaid, said first pump having a first discharge line included in said system and providing a first portion leading into said bypass path, a second pump having a second discharge line connected to another portion of the first discharge line to constitute therewith a common discharge side of the first and second pump for the nozzle supply conduit, a first check valve in said other portion of the first discharge line for preventing discharge from the second pump from reaching said bypass path, and a second check valve in the second discharge line for preventing discharge from the first pump from reaching the second pump.

4. In combination, a plurality of return flow fluid nozzle means adapted to be supplied with fluid under pressure and having a fluid supply conduit, said nozzle plurality using only a portion of the fluid supplied, pump means having a discharge side connected to said fluid conduit and having an intake side, a bypass connecting the intake and discharge sides of the pump means and a second conduit connecting the nozzle plurality and intake side of the pump means, said bypass and said second conduit having a common portion, and a unitary control valve singly acting to coordinate the operation of the bypass and second conduit so as to alternately restrict the pump bypass while restricting the second nozzle conduit and to restrict the said nozzle conduit while leaving free the pump bypass.

5. In combination, a return flow fluid nozzle adapted to be supplied with fluid under pressure and having fluid supply conduit, said nozzle using only a portion of the fluid supplied, pump means having a discharge side connected to said fluid conduit and having an intake side, a control valve comprising an inner balanced reciprocal part and an outer valve part surrounding the inner valve part and having first, second, and third openings, the first and second openings being spaced along the line of reciprocation of the inner valve part, and the third opening being relatively remote thereto, means forming a return flow passage for the nozzle comprising a first conduit means leading from the nozzle to the first opening in the outer valve part and a second conduit means leading from the third opening in the outer valve part to the intake side of the pump means, and means forming a bypass for the pump means comprising the second conduit means and a third conduit means leading from the discharge side of the pump means to the second opening in the outer valve part, means connected to the third conduit means and to the fluid supply conduit of the nozzle forming a path for supplying the latter with fluid under pressure as aforesaid, said inner valve part being adjustable between respective positions to alternately cover to a part way degree the first opening in the outer valve part to restrict the nozzle return flow passage while uncovering the second opening in the outer valve part to leave free the bypass of the pump means and to partly or completely cover the second opening to restrict or block the bypass for the pump means while covering the first opening in the outer valve part to a relatively greater degree than aforesaid.

6. The combination of a liquid-metering device adapted to receive liquid at one pressure and to deliver it at another lower pressure due to pressure loss in metering, pump means having an intake side connected to the delivery side of the device and having a discharge side, a return flow liquid spray nozzle having a liquid supply conduit connected to the discharge side of the pump means, a control valve comprising an inner balanced reciprocal part and an outer valve part surrounding the inner valve part and having first, second and third openings, the first and second openings being spaced along the line of reciprocation of the inner valve part, the third opening being relatively remote thereto, means forming a return flow passage for the nozzle comprising a first conduit means leading from the nozzle to the first opening in the outer valve part and a second conduit means leading from the third opening in the outer valve part to the intake side of the pump means, and means forming a bypass for the pump means comprising the second conduit means and a third conduit means leading from the nozzle liquid supply conduit to the second opening in the outer valve part, said inner valve part being adjustable between respective positions to alternately cover to a part way degree the first opening in the outer valve part to restrict the nozzle return flow passage while uncovering the second opening in the outer valve part to leave free the bypass of the pump means and partly or completely cover the second opening to restrict or block the bypass for the pump means while covering the first opening in the outer valve part to a relatively greater degree than aforesaid to restrict more pronouncedly the nozzle return flow passage, said inner valve part being arranged to have the opposite sides thereof exposed to the receiving and delivery pressures of the liquid-metering device for adjusting the inner valve part with respect to the outer valve part.

7. In combination, a system comprising means for pumping fluid under pressure and having discharge and intake sides, a nozzle of the return flow type adapted to be supplied by the aforesaid means, and having a supply and return conduit connected respectively to discharge and intake sides of the means aforesaid, means forming a bypass path between discharge and intake sides of the means aforesaid, and having a portion in common with said return conduit, and movable means including closable single valve means adjustable with respect to said common portion for progressively and alternately blocking or partially blocking the bypass path while partially blocking the return conduit for the nozzle and for ultimately partially blocking the return conduit while leaving free the bypass path between the discharge and intake sides aforesaid, said movable means being movable in response to pressure variations corresponding to the intake pressure variations of the pumping means, said first named variable pressure urging said single valve means toward a closed position, said bypass path and said return conduit being substantially blocked by said valve means when said valve means approaches said closed position.

8. In combination, a system comprising a means for pumping fluid under pressure having discharge and intake sides, a nozzle of the return flow type supplied by the aforesaid means and having supply and return conduits connected respectively to discharge and intake sides of the means aforesaid, means forming a bypass path between discharge and intake sides of the means aforesaid and having a portion in common with said return conduit, a closable control valve means for the system adjustable with respect to said common portion for progressively and alternately blocking or partially blocking the bypass path while partially blocking the return conduit for the nozzle and for ultimately partially blocking the return conduit while leaving free the bypass path between the discharge and intake sides aforesaid, and means responsive to an increase in the intake pressure of the pumping means for adjusting the valve means toward a closed position, said bypass and said return conduit being substantially blocked when said valve means approaches said closed position.

References Cited in the file of this patent

UNITED STATES PATENTS

| 1,824,952 | Graham et al. | Sept. 29, 1931 |
| 2,157,737 | Janssen | May 9, 1939 |
| 2,334,679 | Mason et al. | Nov. 16, 1943 |
| 2,440,371 | Holley | Apr. 27, 1948 |
| 2,506,611 | Neal et al. | May 9, 1950 |
| 2,537,681 | Lawrence | Jan. 9, 1951 |
| 2,545,856 | Orr | Mar. 20, 1951 |
| 2,595,618 | Vogt et al. | May 6, 1952 |

FOREIGN PATENTS

| 608,860 | Great Britain | June 11, 1946 |
| 918,129 | France | Oct. 7, 1946 |